US008403741B2

(12) United States Patent
de Cuba

(10) Patent No.: US 8,403,741 B2
(45) Date of Patent: Mar. 26, 2013

(54) SMS MESSAGING SYSTEM ACCOMMODATING VARIABLE ENTRIES FOR LOTTERIES

(76) Inventor: Riangelo Javier de Cuba, Oranjestad (AW)

( * ) Notice: Subject to any disclaimer, the term of this patent is extended or adjusted under 35 U.S.C. 154(b) by 49 days.

(21) Appl. No.: 13/045,475

(22) Filed: Mar. 10, 2011

(65) Prior Publication Data

US 2012/0231864 A1    Sep. 13, 2012

(51) Int. Cl.
*G06F 17/00*    (2006.01)

(52) U.S. Cl. .......................................................... 463/17

(58) Field of Classification Search .............. 463/17–19, 463/40–42; 705/39
See application file for complete search history.

(56) References Cited

U.S. PATENT DOCUMENTS

| | | | |
|---|---|---|---|
| 5,920,822 A | 7/1999 | Houde et al. |
| 6,024,640 A | 2/2000 | Walker et al. |
| 6,078,820 A | 6/2000 | Wells et al. |
| 7,031,945 B1 | 4/2006 | Donner |
| 7,069,029 B2 | 6/2006 | Kim |
| 7,083,517 B2 | 8/2006 | Salerno |
| 7,162,454 B1 | 1/2007 | Donner et al. |
| 7,203,665 B2 | 4/2007 | Donner |
| 7,216,109 B1 | 5/2007 | Donner |
| 7,280,975 B1 | 10/2007 | Donner |
| 7,326,111 B2 | 2/2008 | Enzminger et al. |
| 7,343,350 B1 | 3/2008 | Donner |
| 7,379,891 B1 | 5/2008 | Donner et al. |
| 7,386,517 B1 | 6/2008 | Donner |
| 7,415,424 B1 | 8/2008 | Donner |
| 7,472,822 B2 | 1/2009 | Guest et al. |
| 7,476,152 B2 | 1/2009 | Malle et al. |
| 7,529,713 B1 | 5/2009 | Donner |
| 7,562,028 B1 | 7/2009 | Donner |
| 7,562,051 B1 | 7/2009 | Donner |
| 7,565,328 B1 | 7/2009 | Donner |
| 7,577,575 B1 | 8/2009 | Donner et al. |
| 7,577,619 B1 | 8/2009 | Donner et al. |

(Continued)

FOREIGN PATENT DOCUMENTS

| | | |
|---|---|---|
| CN | 101 739 629 A | 6/2010 |
| DE | 10064535 A1 | 6/2002 |

(Continued)

OTHER PUBLICATIONS

China welfare lottery Mobile_Lottery.pdf, www.lottotainment.com. hk, accessed Sep. 9, 2010.

(Continued)

*Primary Examiner* — Ronald Laneau
(74) *Attorney, Agent, or Firm* — Patents and Licensing LLC; Daniel W Juffernbruch

(57) ABSTRACT

A SMS lottery gateway server obtains one SMS message from a mobile phone via a base station over a wide area network and parses the one SMS message to identify therein a plurality of game entries including one or more associated picks. A lottery server receives the game entries and associated picks from the SMS lottery gateway server and plays lottery games based thereon. The SMS lottery gateway server can send one SMS message to the mobile phone acknowledging the identified plurality of lottery game entries. The SMS lottery gateway server can parse the SMS message in various ways such as looking for a number and an associated pick, the number indicating a quantity of the plurality of entries.

18 Claims, 12 Drawing Sheets

U.S. PATENT DOCUMENTS

| | | | |
|---|---|---|---|
| 7,577,620 B1 | 8/2009 | Donner et al. | |
| 7,590,950 B2* | 9/2009 | Collins et al. | 715/864 |
| 7,611,407 B1 | 11/2009 | Itkis et al. | |
| 7,617,159 B1 | 11/2009 | Donner | |
| 7,641,553 B2 | 1/2010 | Roush | |
| 7,708,639 B2 | 5/2010 | Enzminger et al. | |
| 7,733,887 B2 | 6/2010 | Meisl et al. | |
| 2002/0082995 A1 | 6/2002 | Christie, IV | |
| 2002/0098883 A1 | 7/2002 | Packes, Jr. et al. | |
| 2003/0022718 A1 | 1/2003 | Salerno | |
| 2004/0097283 A1 | 5/2004 | Piper et al. | |
| 2004/0198403 A1 | 10/2004 | Pedersen et al. | |
| 2004/0209664 A1 | 10/2004 | Enzminger et al. | |
| 2004/0209691 A1 | 10/2004 | Roush | |
| 2004/0225565 A1 | 11/2004 | Selman | |
| 2004/0259626 A1* | 12/2004 | Akram et al. | 463/17 |
| 2005/0137010 A1 | 6/2005 | Enzminger et al. | |
| 2005/0181875 A1* | 8/2005 | Hoehne et al. | 463/41 |
| 2005/0192078 A1 | 9/2005 | Jawaharlal | |
| 2006/0105830 A1* | 5/2006 | Nemitz et al. | 463/17 |
| 2006/0148552 A1 | 7/2006 | Malle et al. | |
| 2008/0058057 A1 | 3/2008 | Lau et al. | |
| 2008/0113733 A1 | 5/2008 | Kushner | |
| 2008/0161111 A1 | 7/2008 | Schuman | |
| 2008/0167060 A1 | 7/2008 | Moshir et al. | |
| 2009/0258691 A1* | 10/2009 | Jagannatha et al. | 463/17 |
| 2011/0086693 A1* | 4/2011 | Guziel et al. | 463/17 |
| 2011/0269436 A1* | 11/2011 | Porco | 455/414.1 |

FOREIGN PATENT DOCUMENTS

| | | |
|---|---|---|
| DE | 10133519 A1 | 1/2003 |
| DE | 10142864 A1 | 3/2003 |
| EP | 1423817 A4 | 6/2004 |
| EP | 1 475 755 A1 | 11/2004 |
| EP | 1475755 A1 | 11/2004 |
| EP | 1613407 A4 | 1/2006 |
| FR | 2815214 B1 | 4/2002 |
| KR | 2006 0040904 A | 5/2006 |
| KR | 2009 0001815 A | 1/2009 |
| WO | WO9942964 A1 | 8/1999 |
| WO | WO0022908 A2 | 4/2000 |
| WO | WO0143048 A1 | 6/2001 |
| WO | WO0148712 A1 | 7/2001 |
| WO | 01/97105 A2 | 12/2001 |
| WO | 02/077931 A1 | 10/2002 |
| WO | WO03022381 A1 | 3/2003 |
| WO | WO03049827 A1 | 3/2003 |
| WO | 2004114235 A1 | 12/2004 |
| WO | WO2004104743 A3 | 12/2004 |
| WO | WO2005084768 A3 | 9/2005 |
| WO | WO2006041646 A1 | 4/2006 |
| WO | WO2007032960 B1 | 3/2007 |
| WO | WO2008015432 A1 | 2/2008 |
| WO | WO2008030746 A3 | 3/2008 |

OTHER PUBLICATIONS

GTECH Direct—Cover Story, http://extranet.gtech.com/gtech_direct/GTK/GTECHDirect-CoverStory.html, accessed Sep. 9, 2010.
Maxartists Technologies, http://www.maxartists.com/images/media/sms_lottery.pdf, accessed Sep. 9, 2010.
Mobile Lotteries From Million-2-1, http://www.million21.com/Services-and-Solutions/Mobile-Lotteries/, accessed Sep. 15, 2010.
MobiLott Gaming Solutions, SMS Lottery , SMS Soccer Lottery, http://mobilott.net, accessed Sep. 9, 2010.
Oswald, Florin,SMS Lottery, A MOVA Application, ETH Masters Thesis, Sep. 19, 2006.
Play by Text | Lottery Draw Games | The National Lottery, http://www.national-lottery.co.uk/player/p/lotterydrawgames/playbytext.ftl, accessed Sep. 15, 2010.
Spin3—Total Mobile Gaming Solutions, http://www.spin3.com/lotterysolutions.php, accessed Sep. 13, 2010.
English Abstract of FR 2815214.
English Abstract of DE 10064535.
English Abstract of DE 10133519.
English Abstract of DE 10142864.
International Search Report under PCT Article 18 and Rules 43 and 44 by European Patent Office for International application No. PCT/IB2012/000655, mailed Sep. 10, 2012, pp. 1-3.
Written Opinion of the International Searching Authority under PCT Rule 43bis.1 by European Patent Office for International application No. PCT/IB2012/000655, mailed Sep. 10, 2012, pp. 1-6.
English language Abstract for KR 2006 0040904A, (Lim S H) May 11, 2006, Database WPI, Week 200712, Thomson Scientific. London. GB; AN 2007-117158, XP002676408.
International Search Report under PCT Article 18 and Rules 43 and 44 by European Patent Office for International application No. PCT/IB2012/000533, mailed Jun. 1, 2012, pp. 1-4.
Written Opinion of the International Searching Authority under PCT Rule 43bis.1 by European Patent Office for International application No. PCT/IB2012/000533, mailed Jun. 1, 2012, pp. 1-6.
Netherlands Search Report and opinion, pp. 1-7, Oct. 17, 2012.
Megacom Send paid SMS http://www.,egacom.kg/send_sms_eng/, accessed Sep. 13, 2010.
English Abstract of FR 2815214, Apr. 12, 2002.
English Abstract of DE 10064535, Jun. 27, 2002.
English Abstract of DE 10133519, Jan. 30, 2003.
English Abstract of DE 10142864, Mar. 6, 2003.

* cited by examiner

930

PARSING IN THE SMS TRANSACTION GATEWAY SERVER THE ONE SMS MESSAGE TO IDENTIFY THEREIN A PLURALITY OF LOTTERY GAME ENTRIES INCLUDING ONE OR MORE ASSOCIATED PICKS 930

BY LOOKING FOR A NUMBER AND AN ASSOCIATED PICK, THE NUMBER INDICATING A QUANTITY OF THE PLURALITY OF ENTRIES 1010

OR

BY IDENTIFYING A NUMBER WITHIN A SYNTAX INDICATING A NUMBER OF BETS 1020

OR

BY LOOKING FOR A MULTIPLIER DELIMITER ADJACENT TO A NUMBER AND CHOSEN FROM THE GROUP CONSISTING OF AN 'X' CHARACTER OR AN ASTERISK CHARACTER 1030

OR

BY LOOKING FOR EACH OF THE PLURALITY OF ENTRIES SPACED APART WITH A DELIMITER THEREBETWEEN CHOSEN FROM THE GROUP CONSISTING OF A SPACE CHARACTER AND A COMMA CHARACTER 1040

OR

BY PARSING THE SMS MESSAGE TO IDENTIFY A KIND OF GAME AND IDENTIFYING A LETTER FOR THE KIND OF GAME 1050

OR

BY IDENTIFYING A NUMBER FOR A NUMBER OF BETS 1060

OR

BY IDENTIFYING A NUMBER WITHIN A SYNTAX OF EACH ENTRY INDICATING A BET AMOUNT FOR THAT ENTRY 1070

SENDING THE PLURALITY OF GAME ENTRIES IDENTIFIED FROM THE SMS TRANSACTION GATEWAY SERVER TO A LOTTERY SERVER TO PLAY A LOTTERY GAME BASED THEREON 940

BY SENDING THE NUMBER OF BETS IDENTIFIED AND THE ASSOCIATED PICKS FOR THE PLURALITY OF GAME ENTRIES 1110

OR

BY SENDING THE KIND OF GAME IDENTIFIED AND THE ASSOCIATED PICKS FOR EACH OF THE PLURALITY OF GAME ENTRIES 1120

OR

BY SENDING THE NUMBER OF BETS IDENTIFIED TOGETHER WITH THE KIND OF GAME AND THE ASSOCIATED PICKS FOR THE PLURALITY OF GAME ENTRIES 1130

OR

BY SENDING THE BET AMOUNT IDENTIFIED AND THE ASSOCIATED PICK FOR GAME ENTRIES 1140

SMS MESSAGING SYSTEM ACCOMMODATING VARIABLE ENTRIES FOR LOTTERIES

BACKGROUND OF THE INVENTIONS

1. Technical Field

The present inventions relate to wireless phone lotteries and, more particularly, relate to messaging for placing variable SMS lottery entries.

2. Description of the Related Art

Lotteries are known to be played online and over mobile telephones. One common way to pay a lottery over a mobile telephone has been to use text messages also known as the Short Messaging Service (SMS).

One way of playing the lottery by the SMS messages was that a mobile phone operator would charge a customers account for each message. Each message sent to certain lottery phone numbers were billed at a set rate. For example, for each message to a lottery or charity would cost the sender one dollar ($1) on the sender's phone balance. The mobile phone operator would know that each lottery SMS message was worth this one dollar and would deduct this one dollar from the sender's phone balance. The sender would not need to send any money to play the lottery, because the money was charged to the sender's phone balance. The lottery player would SMS text message his or her number pick choice to the phone number for the lottery. If the lottery player desired to pay the lottery more then once, then the player would send more than one text message.

An improved way to make lottery orders by text messaging over a mobile phone is needed.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

The details of the preferred embodiments will be more readily understood from the following detailed description when read in conjunction with the accompanying drawings wherein:

FIG. 10 illustrates a flow diagram of various embodiments for parsing to of steps for identifying a plurality of lottery entries in one SMS message;

FIG. 11 illustrates a flow diagram of various embodiments for sending a lottery game request;

DETAILED DESCRIPTION OF THE PREFERRED EMBODIMENTS

Figure 1:
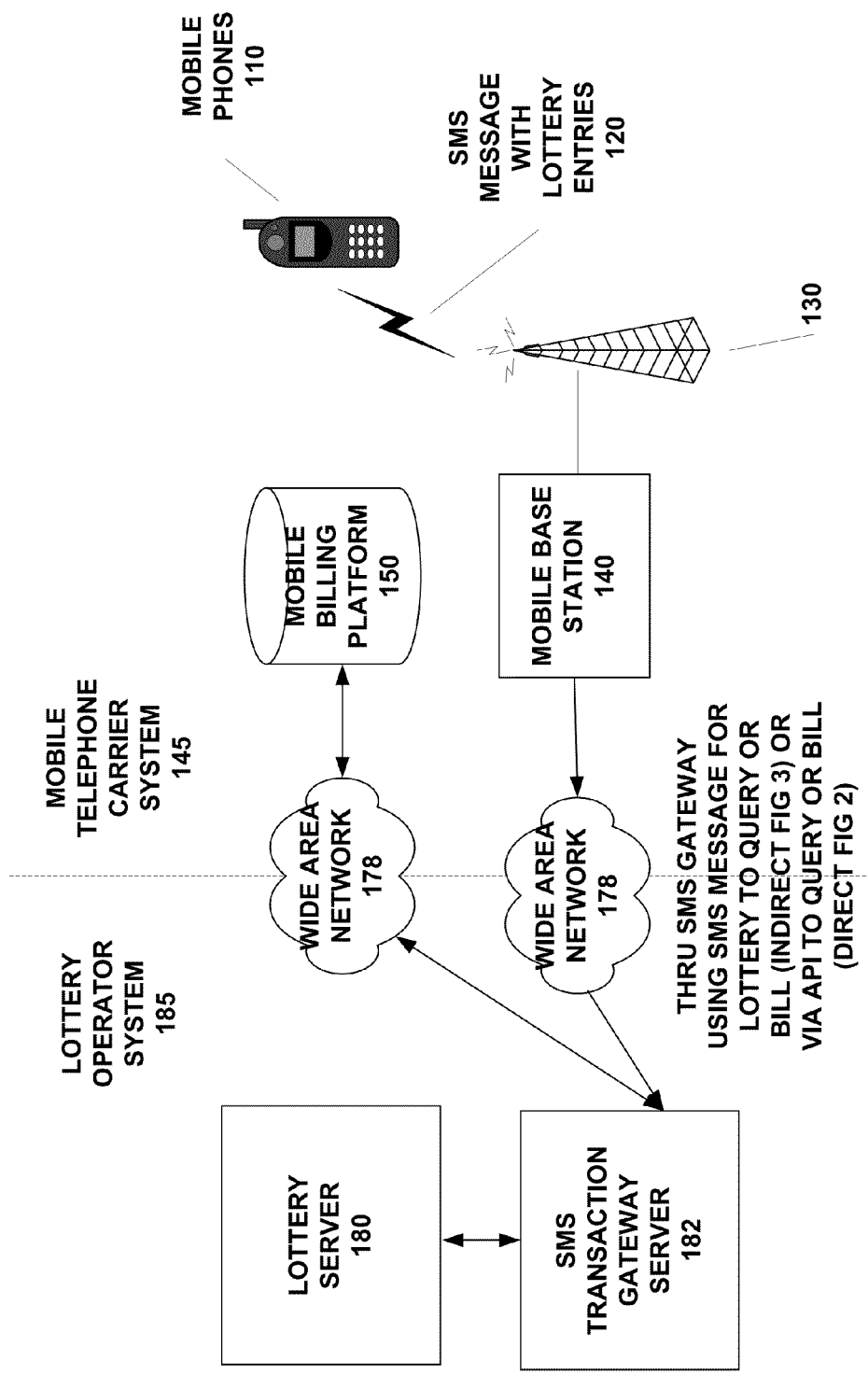
FIG. 1 illustrates a schematic block diagram of the system with both the mobile service provider system and the lottery system according to an embodiment of the present inventions.

FIG. 1 illustrates a schematic block diagram of a SMS lottery platform system with both a mobile telephone carrier system 145 and the lottery operator system 185 according to an embodiment of the present inventions. Mobile phones 110 initiate SMS messages with lottery entries 120. The SMS messages are sent over an antenna 130 and mobile base station 140 of the telephone carrier over a wide area network 178 to an SMS transaction gateway server 182. The SMS transaction gateway server 182 parses an SMS message to identify a plurality of lottery entries in the one message. The plurality of lottery entries is then sent to a lottery server 180 to play a lottery game. Because a plurality of lottery entries can be identified in the one message, the SMS transaction gateway server 182 of this embodiment of the present invention permits more gaming to occur within one message. Previously a mobile phone subscriber needed to send separate SMS messages for single lottery entries.

The SMS transaction gateway server 182 sends a request to a mobile billing platform 150 of the mobile telephone carrier system to request authorization for a charge against a prepaid or postpaid balance of the mobile telephone subscriber stored in the mobile billing platform. This request is sent over the wide area network 178 from the lottery operator system 185 in this one embodiment. The mobile billing platform 150 is able to acknowledge credit and make debits against the balance of the mobile subscriber for lottery transactions requested by the SMS transaction gateway server 182. The debits against the balance of the mobile subscriber are made in an amount corresponding to the number of the plurality of game entries in one SMS message in one embodiment. In other embodiments, besides lottery entries, the subscriber's SMS message can place orders for other products or services, and the SMS transaction gateway server 182 sends a chargeback request to the mobile billing platform 150 to debit against the balance of the mobile subscriber in an amount corresponding to the order in the SMS message.

Confirmation messages to the mobile subscriber of account balance availability and entries and winnings are sent by the SMS transaction gateway server 182 to the mobile phones over the wide area network 178 and the mobile base station 140 and antenna 130. The SMS transaction gateway server 182 is capable of sending acknowledgement of a plurality of entries parsed form one SMS message to the mobile subscriber of the mobile phone. Previously a mobile phone subscriber needed to receive one SMS message confirmation for each entry.

Figure 2:
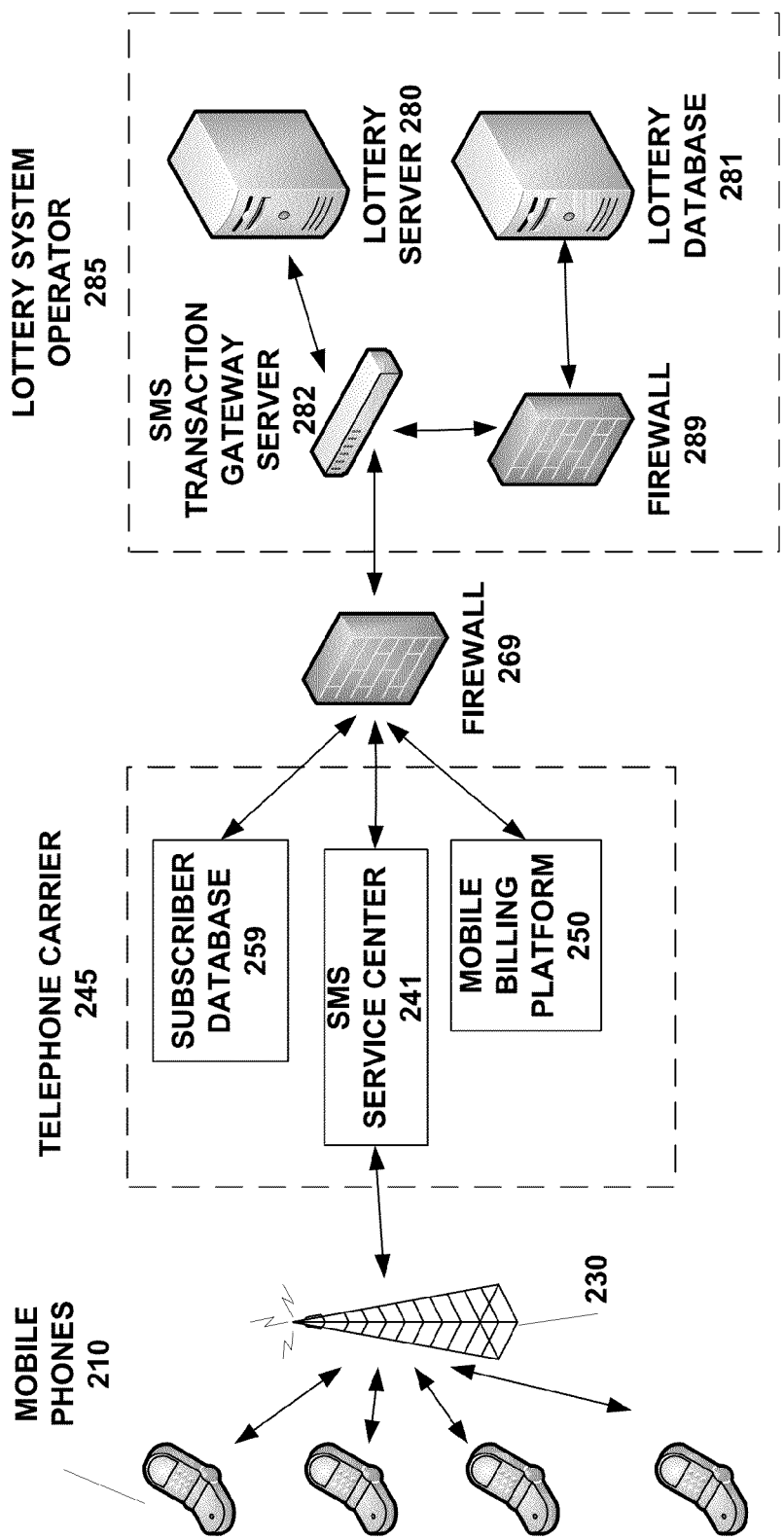
FIG. 2 illustrates a schematic block diagram of a direct integration of the system with both the mobile service provider system and the lottery system according to an embodiment of the present inventions.

FIG. 2 illustrates a schematic block diagram of a direct integration of the system with both the mobile telephone carrier system 245 and the lottery operator system 285 according to an embodiment of the present inventions. Mobile phones 210 communicate over an antenna 230 with an SMS service center 241. The lottery system operator 285 communicates directly via a firewall 269 with the SMS service center 241, a mobile billing platform 250 and a subscriber database 259 of the telephone carrier 245. An SMS transaction gateway server 282 communicates with both a lottery server 280 and via a firewall 289 and with a lottery database server 281. The lottery database server 281 is the lottery system operator database where lottery game tickets are registered among other things. The subscriber database server 259 is used to keep track of subscriber accounts that are able to send SMS messages. The subscriber database server 259 can also be used to designate which postpaid subscribers participate with any SMS lotteries. Prepaid subscribers are generally pre-approved whereas postpaid subscribers need to generally need to be approved and opt-in.

Figure 3:
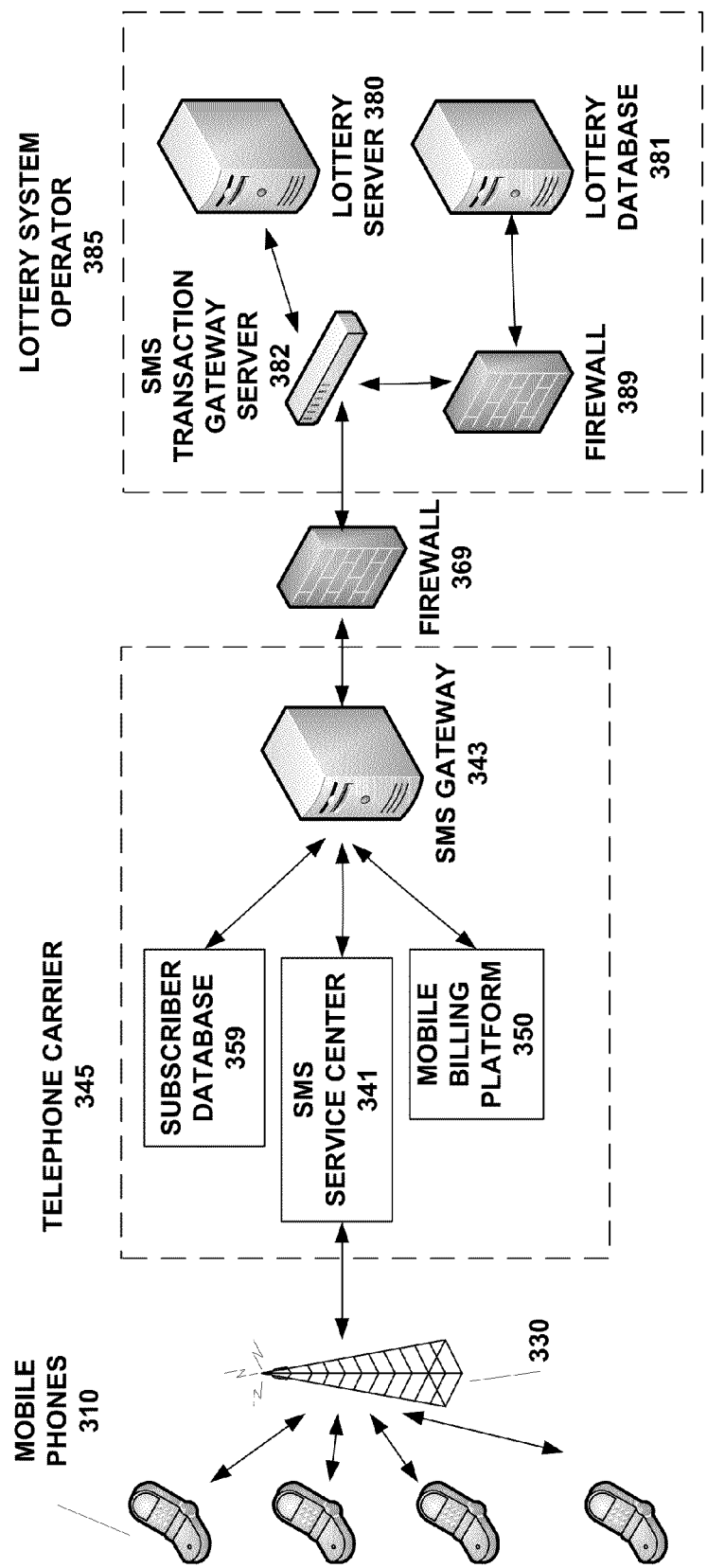
FIG. 3 illustrates a schematic block diagram of an indirect integration of the system with both the mobile service provider system and the lottery system according to an embodiment of the present inventions.

FIG. 3 illustrates a schematic block diagram of an indirect integration of the system with both the mobile telephone carrier system 345 and the lottery operator system 385 according to an embodiment of the present inventions. An SMS gateway 343 implements an API (application programming interface) for communication between the lottery operator system 385 and the mobile telephone carrier system 345. Mobile phones 310 communicate over an antenna 330 with an SMS service center 341. The lottery system operator 385 communicates indirectly via the SMS gateway 343 and a firewall 369 with the SMS service center 341, a mobile billing platform 350 and a subscriber database 359 of the telephone carrier 345. An SMS transaction gateway server 382 communicates with both a lottery server 380 and via a firewall 389 and with a lottery database 381. A server requires a central processor and memory and network interface and generally runs one or more services to serve the needs of others services or servers.

Figure 4:
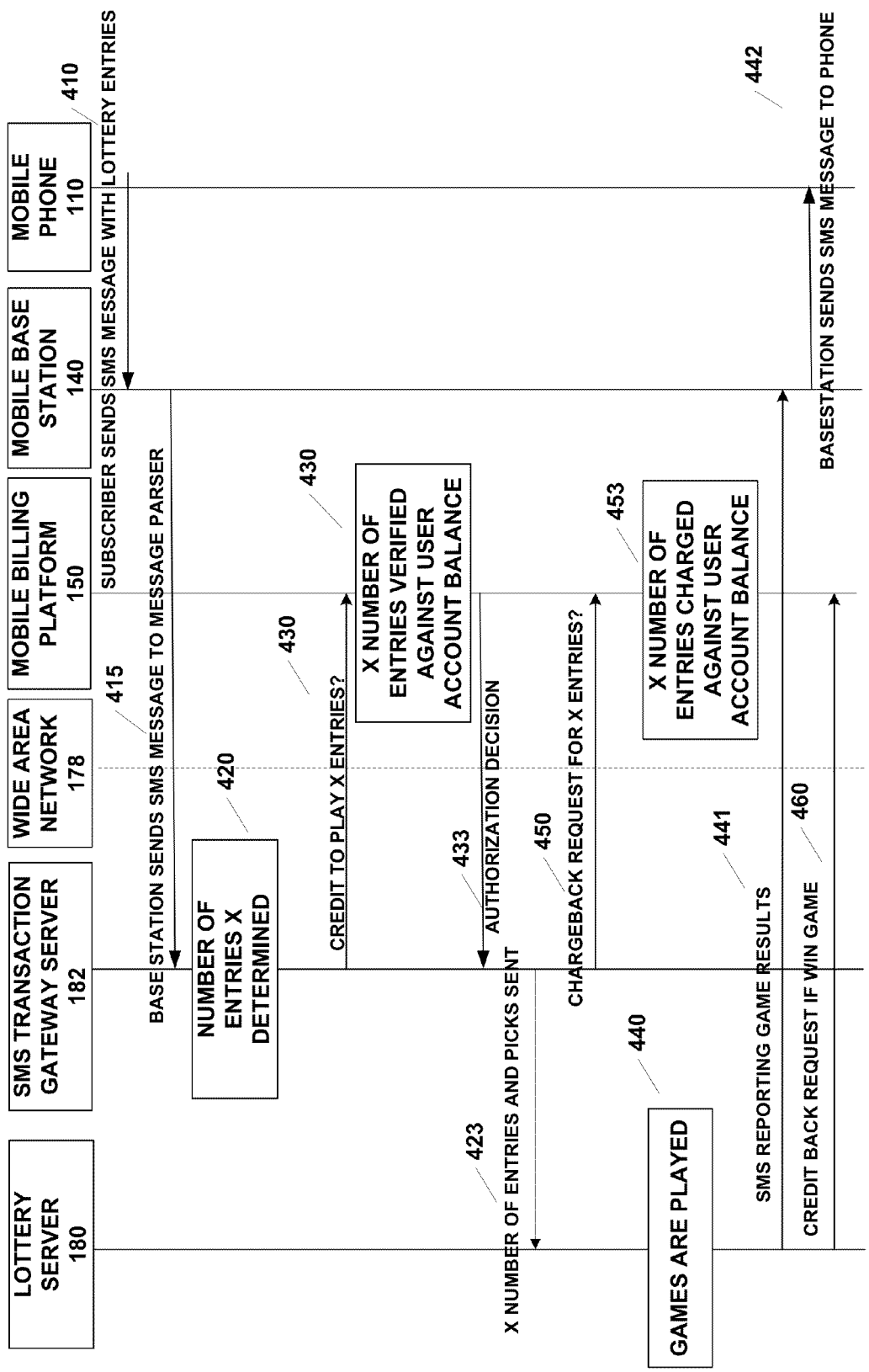
FIG. 4 illustrates a flow diagram of exemplary messages and actions according to an embodiment of the present inventions.

FIG. 4 illustrates a flow diagram of exemplary messages and actions according to an embodiment of the present inventions. In step 410 a subscriber to a mobile phone service sends one SMS message containing a plurality of SMS lottery entries to a mobile base station 140. In step 415 an SMS transaction gateway server 182 receives the one SMS message from the mobile base station 140 over a wide area network 178. The SMS transaction gateway server 182 parses the one SMS message to identify a plurality of lottery entries at step 420.

The plurality of lottery entries can contain picks for the game as will as perhaps an indication of a kind of game in an embodiment. The one SMS message can also contain a number indicating a number of bets or entries a multiplier for fractional bets in another embodiment. The one SMS message can also in a further embodiment contain a plurality of entries, each entry separated form others by a delimiter. An example syntax for a prior art SMS lottery message will later be described with reference to FIG. 7. Example syntaxes for SMS lottery messages of embodiments of the present inventions will later be described with reference to FIG. 8.

Previously telecommunications carriers were unwilling to provide SMS lottery systems capable of handling a plurality of entries, either of the same kind or various kinds, in one message, This was in part because telecommunications carrier hardware was setup for billing by the carrier in increments of one charge per SMS message sent for a lottery. The carrier did not interpret the content of SMS lottery messages, only the address or destination, and thus could only bill in increments of one charge per message. The SMS lottery platform system of the present inventions has been provided at a lottery center to accommodate a plurality of bets per SMS message and charge these bets against a prepaid or postpaid balance of a telephone subscriber.

The SMS transaction gateway server 182 parses the one SMS message from the mobile subscriber to identify a plurality of 'X' lottery entries in step 420. At step 430 the SMS transaction gateway server 182 send a message to a mobile billing platform 150 at the telephone carrier to determine if the telephone subscriber has credit to play 'X' lottery entries. The mobile billing platform 150 verifies X entries against a user balance at step 431 and send an authorization decision at step 433. In step 423 the 'X' lottery entries and any picks are sent to a lottery server 180 of a lottery service center. These authorizations and other messages stated herein are effectively sent on behalf of the lottery server 180 with the SMS transaction gateway server 182 acting as a middleman; thus in certain embodiments two virtual servers can operate on a unified server hardware.

The lottery game is played at step 440. A chargeback request is sent in step 450 from the SMS transaction gateway server 182 to the mobile billing platform 150. At step 453 the mobile billing platform 150 deducts an amount corresponding to 'X' number of lottery entries from the balance of the subscriber's prepaid or postpaid balance. At step 441 an SMS message is sent via the SMS transaction gateway server 182 to notify the subscriber the lottery game results and the base station send the SMS message to the phone at step 442. In one alternative embodiment, a credit back to the subscriber's balance of the winnings can be accomplished by sending a message at step 460 to the mobile billing platform 150.

Figure 5:
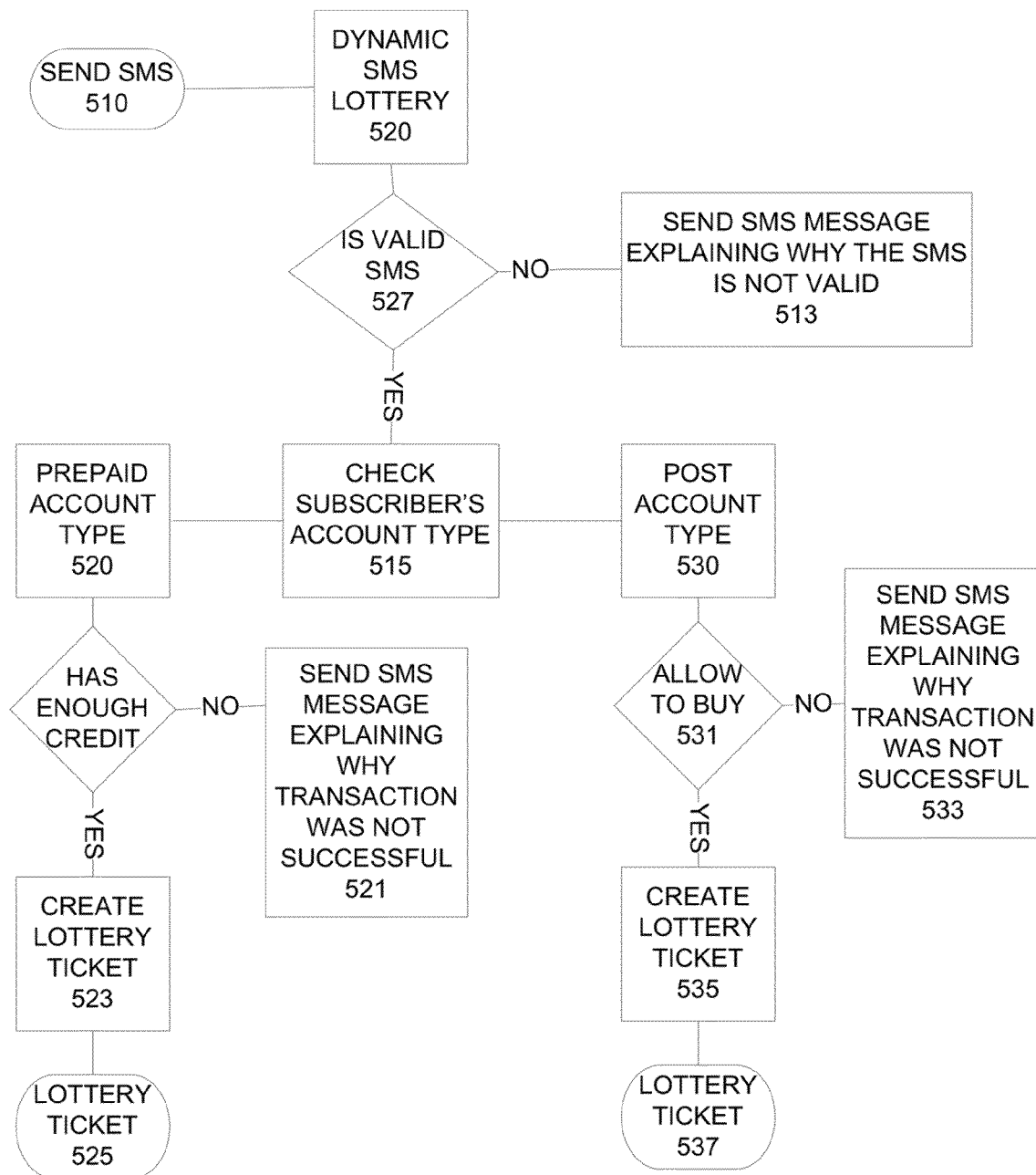
FIG. 5 illustrates a flow diagram of steps for buying numbers according to an embodiment of the present inventions.

FIG. 5 illustrates a flow diagram of steps for buying numbers according to an embodiment of the present inventions. In step 510, the mobile subscriber sends a SMS message that contains one or multiple numbers for one or multiple games using a standard SMS application on a mobile phone or a special application developed for that phone. In step 520, a dynamic SMS lottery system receives a SMS message from the telephone carrier and parses the SMS message to determine what numbers and games the user is trying to purchase. Based on the information inside the one SMS message, the dynamic SMS lottery system knows how much to charge the user. The price of the charge based on the content inside the SMS message. Therefore the price for each SMS is NOT a fixed price. Step 527 determines if the SMS message is a valid message. If the information inside the SMS message is not valid, e.g., not using the specified format, an SMS message is sent in step 513 to the user explaining why the format of the SMS message was not valid. If the information inside the SMS message is valid, step 515 checks the subscriber's account type and proceeds to step 520 for a prepaid account type and step 530 for a postpaid account type.

Step 520 checks if the subscriber has enough credit/minutes in his/her account. If not, then in step 521 a, SMS message is sent explaining why transaction was not successful. If yes, then in step 523, the user has enough credit to purchase lottery tickets and the system will create a lottery ticket and deduct the balance based on the amount of numbers purchased inside the SMS. In step 525 the subscriber receives a confirmation SMS message that contains the lottery ticket with a unique transaction ID.

Step 530 checks if the subscriber's postpaid account POST PAID accounts has some restriction that PREPAID accounts do not have, so need to check with telephone carrier if they are allowed to participate. If the subscriber is not allowed to buy in step 531, then step 533 sends an SMS message explaining why transaction was not successful. If the user is allowed to purchase lottery tickets, in step 535 the system will request a charge back based on the amount of numbers requested in the SMS message. In step 537 the subscriber is sent a confirmation SMS message that contains the lottery ticket with a unique transaction ID.

Figure 6:
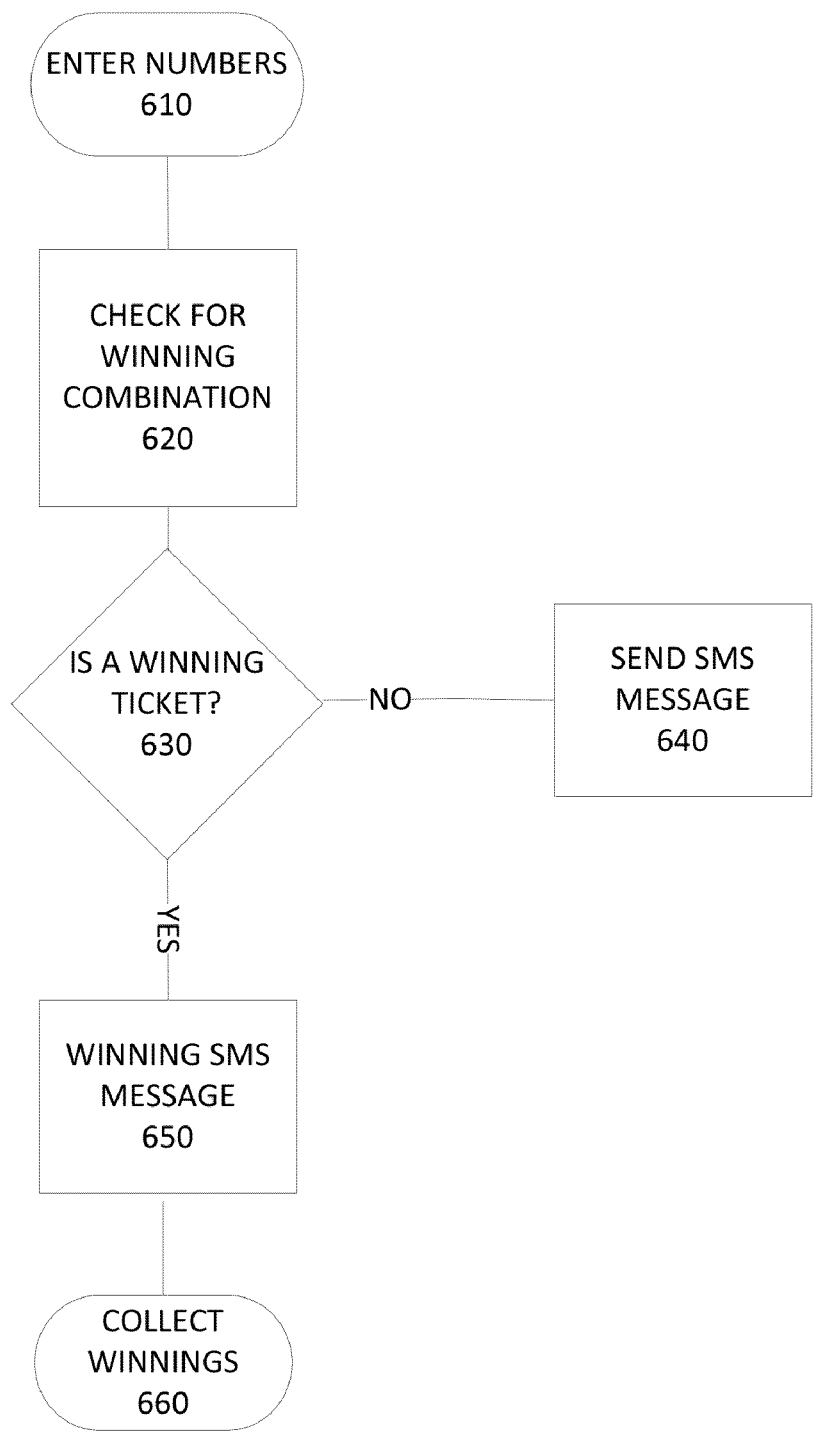
FIG. 6 illustrates a flow diagram of steps for winning numbers according to an embodiment of the present inventions.

FIG. 6 illustrates a flow diagram of steps for winning numbers according to an embodiment of the present inventions. In step 610 winning numbers are entered in the lottery system. Step 620 checks fore a winning combination of numbers. The dynamic SMS Lottery system searches for tickets that the winning number combinations. Step 630 checks for a winning ticket. If the subscriber did not have the winning numbers, an SMS message is sent notifying that they did not win or learn from the dynamic SMS Lottery system and tell them tell them that they are participating in a NONE winner campaign. If the subscriber had the winning combination, step 650 sends an SMS message congratulating them and telling them the amount they won. The SMS message will contain a transaction ID, and info on how to collect their winnings. In step 660, the winning subscriber can collect winnings by showing lottery provider his winning SMS message confirmation ticket. If the user did not receive a SMS message confirmation ticket due to network error, the lottery provider can still see if that mobile phone had a winning ticket. The user can receive or choose to receive his winnings as minutes added to a prepaid balance, cash or transfer to a bank account.

Mobile billing platforms send a chargeback request indicative of the order identified over a wide area network from a SMS transaction gateway server to a mobile billing platform server corresponding to the telephone service belonging to the telephone subscriber for an amount corresponding to the order against a mobile phone balance of the telephone subscriber.

Mobile billing platforms typically handle both prepaid and postpaid mobile telephone user accounts and can be called such as prepaid postpaid billing platforms. Mobile billing platforms typically authorize mobile phone services for a user against his or her account. The mobile billing platforms in certain embodiments can be on or off the premises of a telephone service provider. Examples of mobile billing platforms have been provided by Comverse One and Logica. An Authentication, Authorization, and Accounting (AAA) server or Remote Authentication Dial In User Service (RADIUS) server in certain embodiments can be used as mobile billing platforms.

Figure 7:
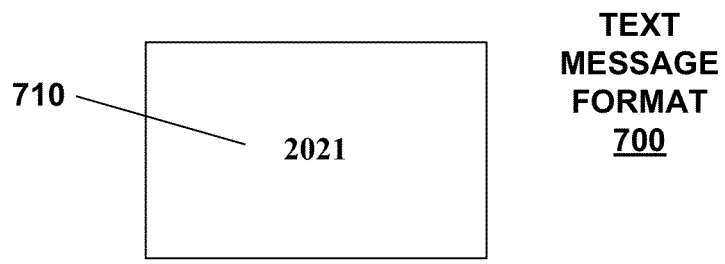
FIG. 7 illustrates an example of a text message format according to the prior art.

FIG. 7 illustrates an example of a text message format 700 according to the prior art. A text message format 700 is illustrated for an SMS message entry. An SMS message 710 contains '2021' and indicates a pick of '2021' for a single entry to the kind of game designated by the address which the SMS message was send.

Figure 8:
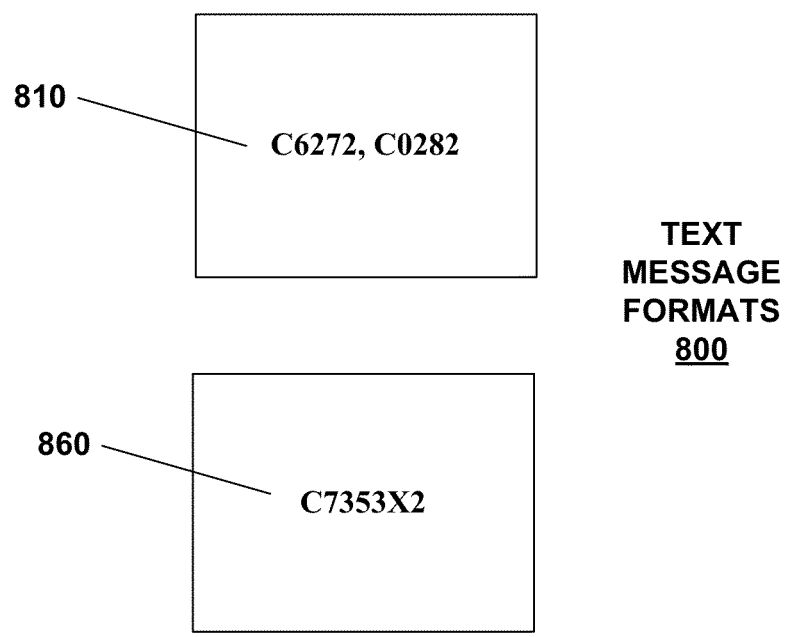
FIG. 8 illustrates an example of a text message format according to an embodiment of the present inventions.

FIG. 8 illustrates examples of text message formats 800 containing a plurality of entries in one message according to embodiments of the present inventions. A text message format 800 is illustrated for two alternate SMS messages.

In a first example message, one SMS message 810 contains 'C6272, C0282'. In this example, the game of the kind 'C' is played once with the pick '6272' and a second time with the pick '0282'. While a comma is used as a delimiter between multiple entries in one SMS message, other characters may be permitted such as spaces, periods or semicolons.

In a second example message, another one SMS message 860 contains 'C7353X3'. In this second example the game of the kind 'C' is played with the pick '7353' a number of '3' times. Here the same short code is used for all games and all amounts. Alternate characters can be used to designate such as asterisk '*' as a multiplier, e.g., 'C7353*3'. Fractional numbers can be permitted by the parser for bets of other than whole increments if the lottery system so permits.

Because each SMS text message had a fixed price, placing multiple lottery ticket entries became a real hassle. For example, if, an end user wants to buy ten different number combinations, the end user would have to send ten different SMS text messages. So, it is not really an alternative way to buy lottery, but just a way to buy some numbers that you forgot to purchase. Since the user will not be sending one message for each lottery combination.

SMS Lottery Ticket Costing Way More (End User)

Some systems would use the premium SMS service, but since mobile service providers (a.k.a. telephone carriers) typically have wanted to keep a large share of the transaction amount, they would have to sell the lottery ticket about twice the traditional price in order to make money. So, if a lottery ticket cost $1, and you buy it via SMS, say it would cost you around $2. So, making it not really an attractive way to purchase lottery.

Telephone carriers have not understood the merits of the present inventions because they traditionally adhered to Average Revenue Per User (ARPU) requirements. The Average Revenue Per User (ARPU) is the average revenue generated per customer of an operator or service provider. The ARPU can be expressed per month or per year. The term ARPU is commonly used by operators, service provider and financial analysts to estimate the Return-On-Investments for investments in network infrastructure and end-user services. When a user buys a prepaid card/minute the telephone carrier see this as money in their pocket since the user can only use it for telephone carrier services like voice and data. Then there was the PREMIUM SMS service where you can use this for running campaigns with third parties. So, the telephone carrier can allow third parties to use their mobile billing platform for selling services, but at a fixed fee. Such as to send an SMS to the number 1234, and you will have a chance to win a ticket to a warm holiday in Aruba. In this case, the third party will get about 30-40% of the revenue. So, the telephone carrier will try to make most of the money since it is money that already is in their pocket, and why sharing it with third parties.

For lottery this would not work since most lottery have a payout percentage of 50% and up, so getting only 30 to 40% of the revenue would not make lottery using premium SMS as the payment method an option since it would not even be enough to pay prices, let alone make any profit.

This is the reason why all SMS lottery are using their own payment methods to make the money to pay the prices (winners). Since, they do not have to pay the lottery any commission on the transactions. This would mean that the end user would have to do something special like register online with a credit card or purchase special lottery prepaid cards in order to buy lottery tickets via SMS. This is not really attractive since the user can not use their money already on their phone to purchase lottery tickets. However, with the Dynamic SMS lottery, we were able to show the telephone carrier that the user would buy even more prepaid cards just to play the lottery, so not really affecting the ARPU, and that telephone carrier making only a transaction fee for each ticket is still more than any traditional campaigns that the telephone carrier would run on a daily basis using standard Premium SMS Services. So, the telephone carrier becomes like a reseller for the lottery. The user does not have to do anything special to buy lottery ticket, just need to have enough credit on their phone. So, using the telephone carrier's own mobile billing platform is convenient since the end user does not need anything special to purchase lottery tickets. So, convincing the Telephone carrier that by only making a small transaction on each ticket is the real challenge. However, it has been discovered that a user purchases much more prepaid cards just to play the lottery. So, the invention puts more money in the telephone carrier's pocket than before.

Previously for lottery entries carriers charged only a flat rate per SMS message or code embedded into an SMS message. When customers wanted to buy more then one lottery entry at a time, they needed to send multiple messages thereby limiting a customer's willingness to spend. Fractional purchases were previously impossible as well.

Objective of the SMS Platform System

The objective with the SMS platform system is to provide the user (i.e. licensee) the ability to operate a lottery system that offers the ability to have control or to be able to operate the lottery with increased profit margins, to monitor the system sales and to push sales through direct campaigns.

Vis-à-vis the end-user (i.e. the consumer) the objective is to allow the end-user to purchase lottery without having to leave their home or place of work or even while being out of the country, while having the comfort of having purchased a ticket and being notified of any winning without having to go online or find the winning numbers in the traditional media.

Note that the SMS platform system does not require the consumer to go through a log-in procedure nor to open an account with a lottery operator (or any third party) in order to participate in the lottery. This allows for maximum penetration in mobile markets and to churn consumers from the traditional method of purchasing a lottery ticket to the SMS platform.

Sample Procedure for Purchases on SMS Platform System 1 end-user wishing to purchase one or more tickets simultaneously, creates a text message and sends it to a dedicated number, typically a "short code" i.e. 777

2 system receives the request and sends confirmation request of eligibility to participate and authorization for purchase 3 end-user provides authorizations via return SMS 4 system verifies that the end-user has enough credit on their mobile phone account to make purchase. If not transaction is aborted due to insufficient credit. If yes, the transaction is processed and end-user gets a SMS confirmation 5 winning tickets will receive a winning message notification instantly or receive a winning notification via registered address of mobile end-user, provided the address is known to the mobile phone operator. (The latter is not possible with pre-paid phones, since the address is not known to the mobile phone operator, unless the end-user registers a physical address with his phone number at the time of registration.)

6 end-user will have choice of collecting cash or having winning applied to their mobile phone account, allowing them to make more purchases or place regular calls or settle their account;

Examples of How to Buy Numbers

Pick 4, Pick 3 and Pick 2—Dynamic SMS Lottery

What makes Dynamic SMS Lottery unique is that the price for each SMS is based on the content of the message and not the message itself like traditional SMS Lottery.

To make this possible we have our own unique format for each message.

We have multiple games, and to identify each game, we use the letter of the games in front of the desired number.

The available games are:
1. Curacao=C or K
2. SmartPlay=S
3. Daily Numbers=D

Here are the different ways people would be able to buy their numbers.

1. Wants to buy for Curacao only one number, the number 7353 for $1

The user will send C7353 or K7353 or 7353 (If there is no letter, the system will make it for Curacao)

2. Wants to buy for Curacao only one number, the number 7353 for $2

The user will send C7353X2 or C7353*2 (The user can use X or * to indicate the amount for each number)

3. Wants to buy for Curacao two numbers, the number 6272 and 0282

The user will send C6272, C0282 or C6272 C0822 (The user can use a space or a comma to separate the numbers)

4. Wants to buy 6345 for Curacao and for SmartPlay

The user will send C6345, C6345 (Since the user did not specify the amount, the price for each number is the default 1$)

5. Wants to buy 6345 for Curacao and for SmartPlay and each number $2

The user will send C6345x2, S6345x2 or C6345*2, S6345*2

If the user wants to buy for different games, then the user can use the letter that correspond with that game. By using this format, the user can buy multiple numbers and also a different bet for each number.

Other Options of the SMS Platform Systems

By developing a database of participating mobile numbers the user can on itself or in conjunction with other partners: offer lottery sales, campaigning, promotions, voting, quizzing, polling and push smart ads. It can be used to place orders and manage chargeback for many products and services.

The above embodiments show examples of novel SMS message formats to play the 4, 3 and 2 digit lottery games. These novel formats are analogous to traditional lotto games in the US called pick 4 and pick 3.

Pick 4=http://www.state.nj.us/lottery/games/1-4-1_pick4.shtml

Pick 3=http://www.state.nj.us/lottery/games/1-5-1_pick3.shtml

Security

In order to maximize the security and integrity of the applications the security levels can be monitored in-house and internal checks performed. In addition, services of an independent third security evangelist can verify the robustness of the security levels of the applications. The security of the financial transactions can be verified by an implementer's data, verification by engaged third party independent security evangelist and with the proper legal safeguards in place the software can be tested for security purposes by other security evangelists.

Integration with Secure Lottery Systems and Processes; SMS Ticket Sales Including Data Entry, Merging with Lottery Game Pools The SMS platform system can be implemented interphase allowing winning numbers to be synchronized with the SMS platform and allowing the data entered via the SMS platform to be synchronized with current lottery systems.

Player registration and loyalty programs should address player database management, ad-hoc reporting, promotions, animated game demos, drawings, or winner reveals, prize fulfillment, and any opportunities to provide sources for lottery prize giveaways.

Player registration takes place at the time purchase is desired, as outlined above. The SMS platform provides a series of standard reports and customizable reports for reporting purposes. The accounting data can also be exported into the lottery operators accounting system or can produce accounting reports in a spreadsheet format. Winning notification has been addressed above.

Cellular phone should also address opt-in text messaging, promotional updates, couponing, and advertising.

End-user wishing to opt-in text messaging, promotional updates, couponing and advertising can do so by applying via a text message. "Reminder to purchase"-messages can also be generated by the system and send to (selected) end-users. The operator can also run regular premium SMS campaigns via medial like: newspapers, radio, cable and web to promote sales, to provide coupons or advertising in general, through a separate module that integrates in the system.

The SMS transaction gateway is a middleman server between a mobile service provider (a.k.a. Telecom) and third parties. The mobile service provider would use this to prevent direct integration of a lottery service center or other provider of purchased products or services with either the mobile service provider's Short Message Service Center (SMSC) and mobile billing platform. When using a SMS transaction gateway, the third party would only by contacting the SMS transaction gateway, and this SMS transaction gateway would be than contacting the internal systems of the mobile service provider. Also, a lot of times SMSC would have a different protocol so, making integration difficult, so SMS transaction gateways can provide one standard protocol to the third parties, and the SMS transaction gateway would deal with all these different protocols for you. So, making integration with third parties much easier.

The lottery server is the system at a lottery service center that checks all kinds of criteria before creating the lottery ticket. A Lottery Database is where the tickets are stored, all transaction information. A subscriber database is a mobile service provider's database of all their mobile subscriber accounts. The mobile billing platform is the mobile service provider billing system. This is the system that knows how much account credit or money on deposit in the case of a prepaid subscriber.

The SMS transaction gateway server can be located at the lottery service center. It preferably contains a SMS message parser and interpreter to make the system successful. A very smart interpreter can be used because novice users tend to enter pretty much anything or use sentences thinking they are chatting with some real person at the other end, so we had to create a smart parser that would try to understand what the user is trying to buy.

Figure 9:
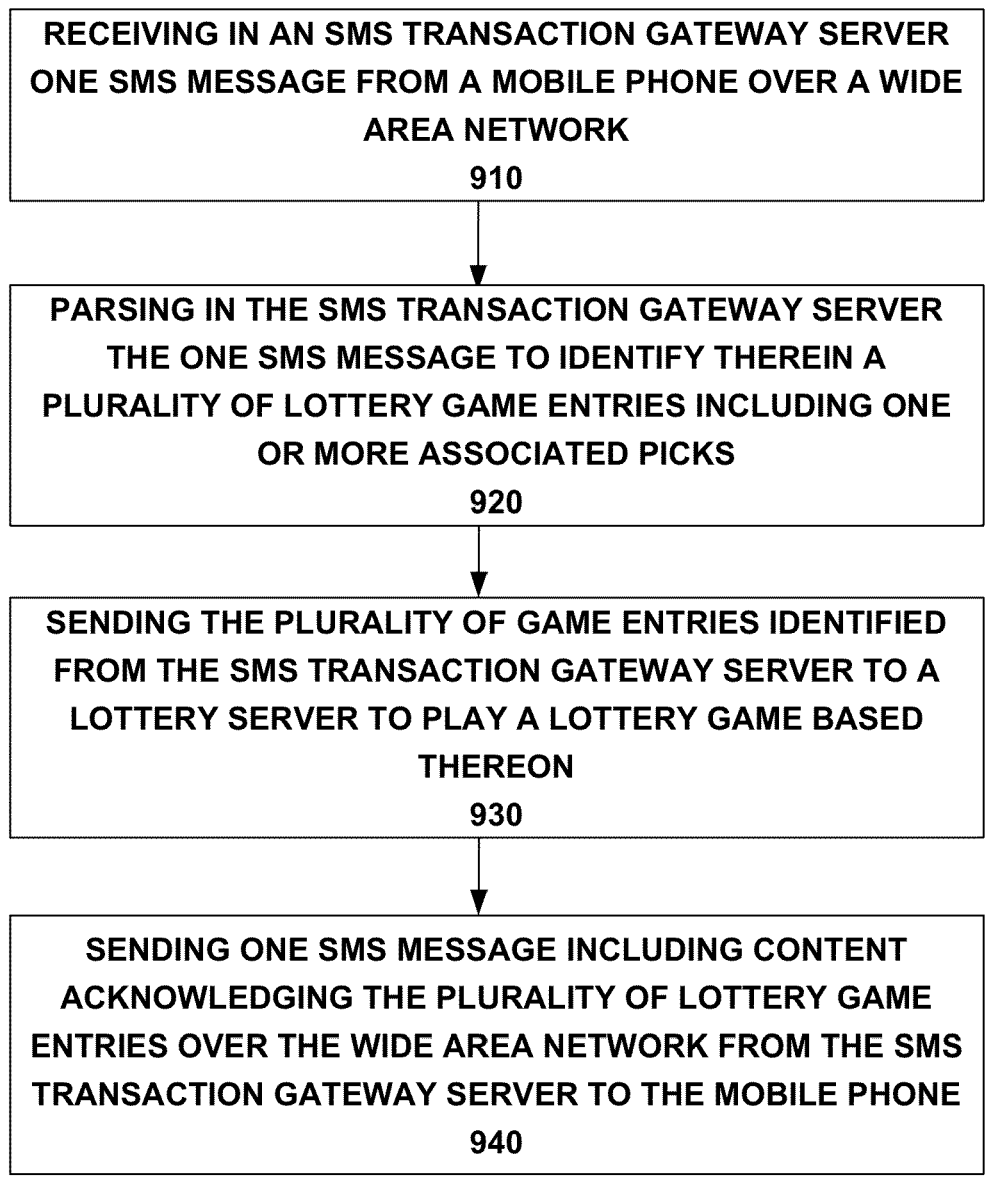
FIG. 9 illustrates a flow diagram of steps for identifying a plurality of lottery entries in one SMS message and messages for processing the lottery game according to one embodiment.

FIG. 9 illustrates a flow diagram of steps for identifying a plurality of lottery entries in one SMS message and messages for processing the lottery game according to one embodiment.

Step 910 illustrates receiving in an SMS transaction gateway server one SMS message from a mobile phone over a wide area network. Step 920 illustrates parsing in the SMS transaction gateway server the one SMS message to identify therein a plurality of lottery game entries including one or more associated picks. Step 930 illustrates sending the plurality of game entries identified from the SMS transaction gateway server to a lottery server to play a lottery game based thereon. Step 940 illustrates that the SMS transaction gateway can also send one SMS message including content acknowledging the plurality of lottery game entries over the wide area network from the SMS transaction gateway server to the mobile phone.

FIG. 10 illustrates a flow diagram of various embodiments of step 930 in FIG. 9 for parsing to identify a plurality of lottery entries in one SMS message.

Step 1010 illustrates looking for a number and an associated pick, the number indicating a quantity of the plurality of entries. Step 1020 illustrates an alternative embodiment of identifying a number within a syntax indicating a number of bets. Step 1030 illustrates an alternative embodiment of looking for a multiplier delimiter adjacent to a number and chosen from the group consisting of an 'X' character or an asterisk character. Step 1040 illustrates an alternative embodiment of looking for each of the plurality of entries spaced apart with a delimiter therebetween chosen from the group consisting of a space character and a comma character. Step 1050 illustrates an alternative embodiment of parsing the SMS message to identify a kind of game and identifying a letter for the kind of game. Step 1060 illustrates an alternative embodiment of identifying a number for a number of bets. The number can be whole numbers or alternately fractional bets. That is the number can be fractional bets more than 1 or an amount. Step 1070 illustrates an alternative embodiment of identifying a number within a syntax of each entry indicating a bet amount for that entry.

FIG. 11 illustrates a flow diagram of various embodiments of step 940 in FIG. 9 for sending a lottery game request. Step 1110 illustrates an alternative embodiment of sending the number of bets identified and the associated picks for the plurality of game entries. Step 1120 illustrates an alternative embodiment of sending the kind of game identified and the associated picks for each of the plurality of game entries. Step 1130 illustrates an alternative embodiment of sending the number of bets identified together with the kind of game and the associated picks for the plurality of game entries. Step 1140 illustrates an alternative embodiment of sending the bet amount identified and the associated pick for game entries.

Figure 12:
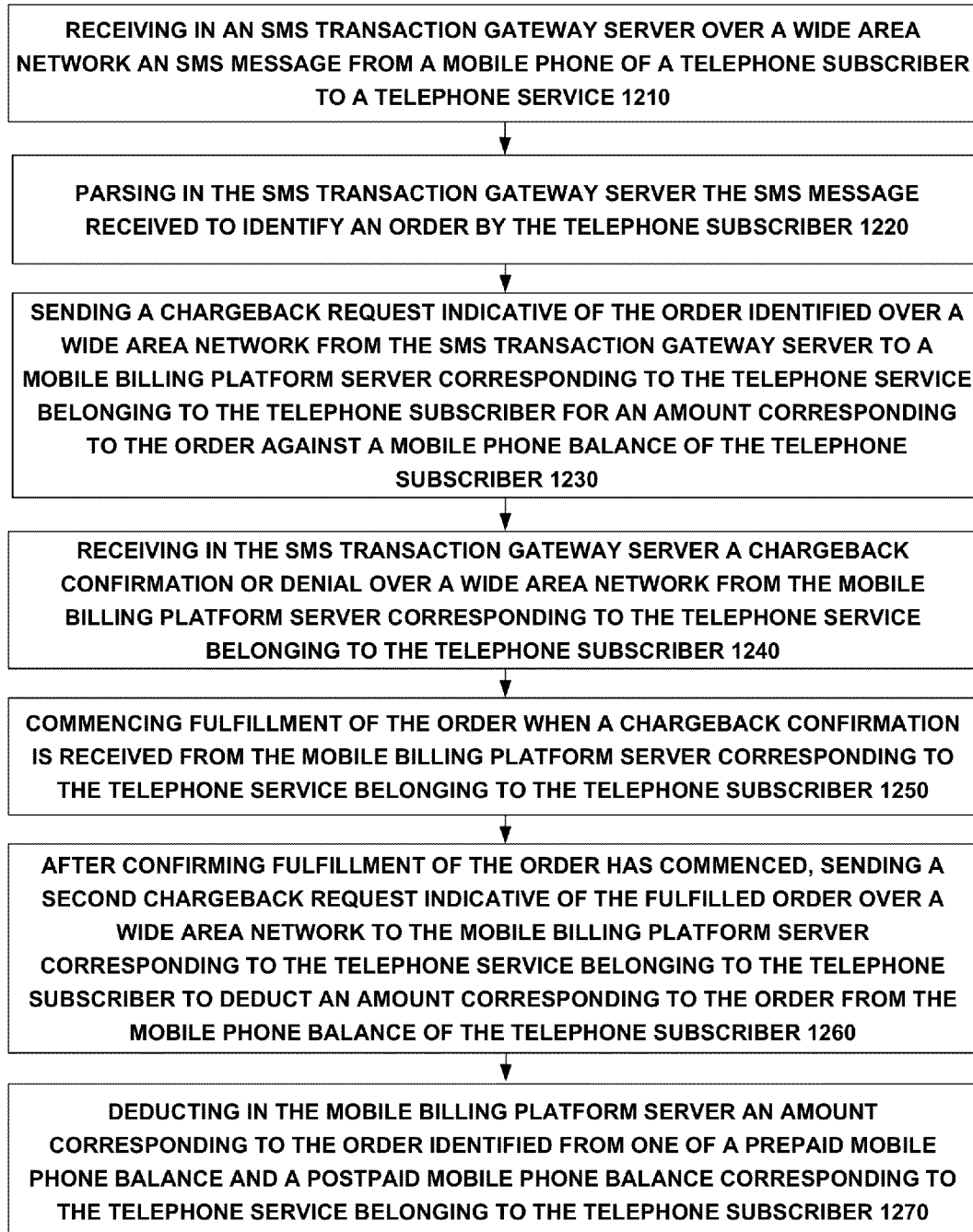
FIG. 12 illustrates a flow diagram of steps for receiving an SMS order and sending a chargeback request against a mobile account according to one embodiment.
Figure 13:
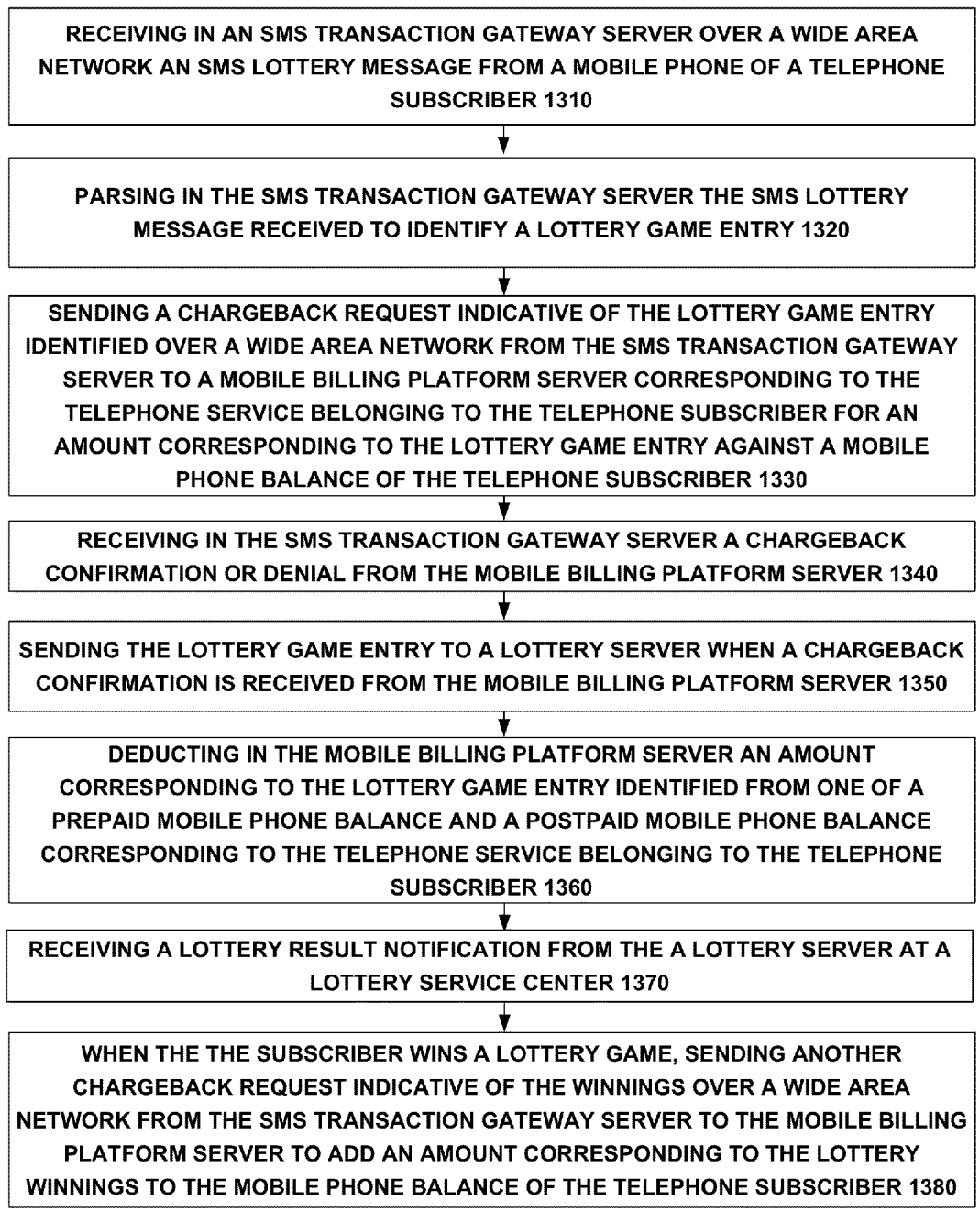
FIG. 13 illustrates a flow diagram of steps for receiving an SMS lottery entry and sending a chargeback request against a mobile account according to one other embodiment.

FIG. 12 illustrates a flow diagram of steps for receiving an SMS order and sending a chargeback request against a mobile account according to one embodiment. Step 1210 illustrates receiving in an SMS transaction gateway server over a wide area network an SMS message from a mobile phone of a telephone subscriber to a telephone service. Step 1220 illustrates parsing in the SMS transaction gateway server the SMS message received to identify an order by the telephone subscriber. Step 1230 illustrates sending a chargeback request indicative of the order identified over a wide area network from the SMS transaction gateway server to a mobile billing platform server corresponding to the telephone service belonging to the telephone subscriber for an amount corresponding to the order against a mobile phone balance of the telephone subscriber. Step 1240 illustrates receiving in the SMS transaction gateway server a chargeback confirmation or denial over a wide area network from the mobile billing platform server corresponding to the telephone service belonging to the telephone subscriber. Step 1250 illustrates commencing fulfillment of the order when a chargeback confirmation is received from the mobile billing platform server corresponding to the telephone service belonging to the telephone subscriber. Step 1260 illustrates after confirming fulfillment of the order has commenced, sending a second chargeback request indicative of the fulfilled order over a wide area network to the mobile billing platform server corresponding to the telephone service belonging to the telephone subscriber to deduct an amount corresponding to the order from the mobile phone balance of the telephone subscriber Step 1270 illustrates deducting in the mobile billing platform server an amount corresponding to the order identified from one of a prepaid mobile phone balance and a postpaid mobile phone balance corresponding to the telephone service belonging to the telephone subscriber FIG. 13 illustrates a flow diagram of steps for receiving an SMS lottery entry and sending a chargeback request against a mobile account according to one other embodiment. Step 1310 illustrates receiving in an SMS transaction gateway server over a wide area network an SMS message from a mobile phone of a telephone subscriber to a telephone service.

Step 1320 illustrates parsing in the SMS transaction gateway server the SMS message received to identify a lottery game entry including one or more associated picks by the telephone subscriber. Step 1330 illustrates sending a chargeback request indicative of the lottery game entry identified over a wide area network from the SMS transaction gateway server to a mobile billing platform server corresponding to the telephone service belonging to the telephone subscriber for an amount corresponding to the lottery game entry against a mobile phone balance of the telephone subscriber. Step 1340 illustrates receiving in the SMS transaction gateway server a chargeback confirmation or denial over a wide area network from the mobile billing platform server corresponding to the telephone service belonging to the telephone subscriber.

Step 1350 illustrates commencing fulfillment of the lottery game entry by sending the lottery game entry to a lottery server when a chargeback confirmation is received from the mobile billing platform server corresponding to the telephone service belonging to the telephone subscriber by sending. It may be desirable to wait until after confirming fulfillment of the order has commenced and send a second chargeback request indicative of the fulfilled lottery game entry over a wide area network to the mobile billing platform server corresponding to the telephone service belonging to the telephone subscriber to deduct an amount corresponding to the lottery game entry from the mobile phone balance of the telephone subscriber. This was illustrated in step 1260 of FIG. 12.

Step 1360 illustrates deducting in the mobile billing platform server an amount corresponding to the lottery game entry identified from one of a prepaid mobile phone balance and a postpaid mobile phone balance corresponding to the telephone service belonging to the telephone subscriber.

Step 1370 illustrates receiving a lottery result notification from the lottery server at a lottery service center.

Step 1380 illustrates, when the lottery result notification from the lottery server indicates the subscriber won a lottery game, sending another chargeback request indicative of the winnings over a wide area network from the SMS transaction gateway server to the mobile billing platform server corresponding to the telephone service belonging to the telephone subscriber to add an amount corresponding to the lottery winnings to the mobile phone balance of the telephone subscriber.

While the steps of the embodiment of FIG. 13 illustrate the placing of orders for lottery entries, these steps could be used to place orders for products or services other than lottery entries. The step of parsing the SMS message for game entries would parse the message for the products or services ordered. A quantity and kind would be determined and a chargeback request established. While the telephone carrier can use this system to deduct a dollar currency amount against a subscriber's prepaid or postpaid wireless phone balance, it is also alternately possible the system could alternately deduct minutes.

Any letter designations such as (a) or (b) etc. used to label steps of any of the method claims herein are step headers applied for reading convenience and are not to be used in interpreting an order or process sequence of claimed method steps. Any method claims that recite a particular order or process sequence will do so using the words of their text, not the letter designations.

Unless stated otherwise, terms such as "first" and "second" are used to arbitrarily distinguish between the elements such terms describe. Thus, these terms are not necessarily intended to indicate temporal or other prioritization of such elements.

Any trademarks listed herein are the property of their respective owners, and reference herein to such trademarks is generally intended to indicate the source of a particular product or service.

Although the inventions have been described and illustrated in the above description and drawings, it is understood that this description is by example only, and that numerous changes and modifications can be made by those skilled in the art without departing from the true spirit and scope of the inventions. For example, although SMS text message are handled in the present inventions' embodiments, future and successor modes of sending text messages could be implemented and are considered within the scope of an SMS message. Although the examples in the drawings depict only example constructions and embodiments, alternate embodiments are available given the teachings of the present patent disclosure.

What is claimed is:

1. A method of interpreting an SMS lottery message comprising the steps of:
   (a) receiving in an SMS transaction gateway server one SMS message from a mobile phone over a wide area network;
   (b) parsing in the SMS transaction gateway server the one SMS message so received in said step (a) to identify in the one SMS message a plurality of lottery game entries by looking for a multiplier number within a syntax indicating a quantity of entries, the plurality of lottery game entries including one or more associated picks per lottery game entry; and
   (c) sending the plurality of game entries identified in said step (b) from the SMS transaction gateway server to a lottery server to play a lottery game based thereon.

2. A method of interpreting an SMS lottery message according to claim 1, further comprising the step of:
   (d) sending one SMS message over the wide area network from the SMS transaction gateway server to the mobile phone, the one SMS message including content acknowledging the plurality of lottery game entries identified in said step (b).

3. A method of interpreting an SMS lottery message according to claim 1, wherein said step (b) of parsing in the SMS transaction gateway server looks for a number and one or more associated picks, the number indicating a quantity of the plurality of entries.

4. A method of interpreting an SMS lottery message according to claim 1, wherein said step (c) of sending further comprises the substep of
   (c1) sending the quantity of entries identified in said step (b) and the associated picks for the plurality of game entries from the SMS transaction gateway server to a lottery server to play the lottery game at a lottery service center based thereon.

5. A method of interpreting an SMS lottery message according to claim 4, wherein said step (b) of identifying a multiplier number within a syntax comprises the substep of
   (b1) looking for a multiplier delimiter adjacent to a number and chosen from the group consisting of an 'X' character and an asterisk character.

6. A method of interpreting an SMS lottery message according to claim 1, wherein said step (b) of parsing looks for each of the plurality of entries spaced apart with a delimiter therebetween chosen from the group consisting of a space character and a comma character.

7. A method of interpreting an SMS lottery message according to claim 1,
wherein said step (b) of parsing comprises the substep of (b1) parsing the SMS message to identify a kind of game; and
wherein said step (c) of sending comprises the substep of (c1) sending the kind of game identified in said step (b) and the associated picks for each of the plurality of game entries from the SMS transaction gateway server to a lottery server to play the lottery game at a lottery service center based thereon.

8. A method of interpreting an SMS lottery message according to claim 7, wherein said step (b1) of parsing the SMS message to identify a kind of game further comprises the steps of:
(b1i) identifying a letter for the kind of game; and
(b1ii) identifying a number for a quantity of entries.

9. A method of interpreting an SMS lottery message according to claim 8, wherein said step (c1) of sending the kind of games further comprises the substep of:
(c1i) sending the quantity of entries identified in said step (b1ii) together with the kind of game and the associated picks for the plurality of game entries from the SMS transaction gateway server to a lottery server to play the lottery game at a lottery service center based thereon.

10. A method of interpreting an SMS lottery message according to claim 1,
wherein said step (b) of parsing further comprises the substep of (b1) identifying a number within a syntax of each message indicating an entry amount for that message; and
wherein said step (c) of sending further comprises the substep of (c1) sending the entry amount identified in said step (b1) and the associated pick for game entries from the SMS transaction gateway server to a lottery server to play the lottery game at a lottery service center based thereon.

11. A system for interpreting an SMS lottery message comprising:
a base station and antenna for receiving SMS messages from a mobile phone;
a SMS lottery gateway server operatively coupled to obtain the SMS messages from the base station over a wide area network, wherein the SMS lottery gateway server parses one SMS message to identify in the one SMS message a plurality of game entries by looking for a multiplier number within a syntax indicating a quantity of entries and one or more associated picks of the one SMS message, the plurality of lottery game entries including one or more associated picks per lottery game entry; and
a lottery server operatively coupled to the SMS lottery gateway server to receive the game entries and associated picks and play lottery games based thereon.

12. A system for interpreting an SMS lottery message according to claim 11, wherein the SMS lottery gateway server is operatively coupled to send one SMS message over the wide area network from the SMS transaction gateway server via the base station to the mobile phone, the one SMS message including content acknowledging the plurality of lottery game entries identified in said step (b).

13. A system for interpreting an SMS lottery message according to claim 11, wherein the a lottery server receives the quantity of entries and the associated picks for the plurality of game entries to a lottery server at a lottery service center to play the lottery games based thereon.

14. A system for interpreting an SMS lottery message according to claim 13, wherein the SMS lottery gateway server parses the SMS message by identifying a multiplier number within a syntax by looking for a multiplier delimiter adjacent to a number and chosen from the group consisting of an 'X' character and an asterisk character.

15. A system for interpreting an SMS lottery message according to claim 11, wherein the SMS lottery gateway server parses the SMS message by identifying a number within a syntax by looking for each of the plurality of entries spaced apart with a delimiter therebetween chosen from the group consisting of a space character and a comma character.

16. A system for interpreting an SMS lottery message according to claim 11,
wherein the SMS lottery gateway server parses the SMS message to identify a kind of game; and
wherein the lottery server receives the kind of game and the associated picks for the plurality of game entries to a lottery server to play a lottery game based thereon.

17. A system for interpreting an SMS lottery message according to claim 11, wherein the lottery server receives the entry amount and the associated pick from the SMS lottery gateway server for game entries and plays the lottery games based thereon.

18. A method of interpreting an SMS lottery message comprising the steps of:
(a) receiving in an SMS transaction gateway server one SMS message from a mobile phone over a wide area network;
(b) parsing in the SMS transaction gateway server the one SMS message so received in said step (a) to identify therein a plurality of lottery game entries including one or more associated picks; and
(c) sending the plurality of game entries identified in said step (b) from the SMS transaction gateway server to a lottery server to play a lottery game based thereon; and
wherein said step (b1) of identifying a number within a syntax comprises the substep of (b1i) looking for a multiplier delimiter adjacent to a number and chosen from the group consisting of an 'X' character and an asterisk character.

* * * * *